Nov. 21, 1967  S. HOPKINS  3,353,478
WASTE COLLECTING AND COMPACTING UNIT
Filed Feb. 24, 1966  3 Sheets-Sheet 1

INVENTOR
Stephen Hopkins
BY Wilkinson, Mawhinney & Theibault
ATTORNEYS

Nov. 21, 1967     S. HOPKINS     3,353,478

WASTE COLLECTING AND COMPACTING UNIT

Filed Feb. 24, 1966     3 Sheets-Sheet 2

INVENTOR
Stephen Hopkins

BY Wilkinson, Mawhinney & Theibautt
ATTORNEYS

Nov. 21, 1967　　　　　　S. HOPKINS　　　　　　3,353,478
WASTE COLLECTING AND COMPACTING UNIT
Filed Feb. 24, 1966　　　　　　　　　　　　3 Sheets-Sheet 3
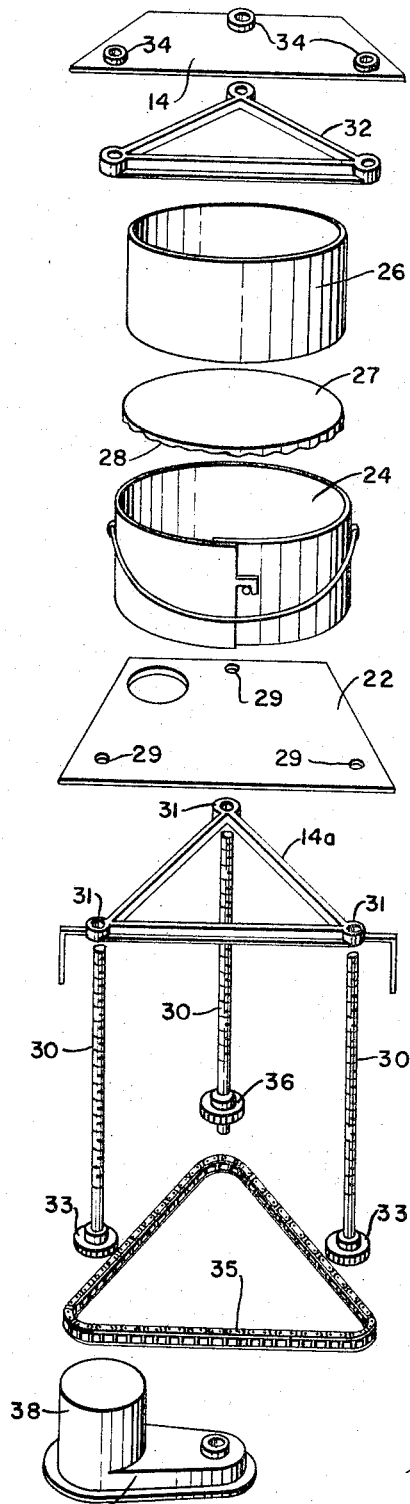
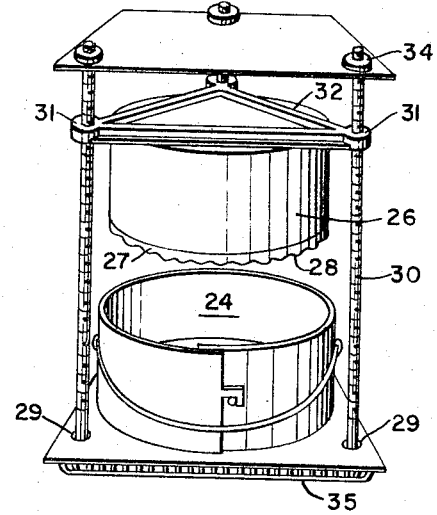
FIG.7.
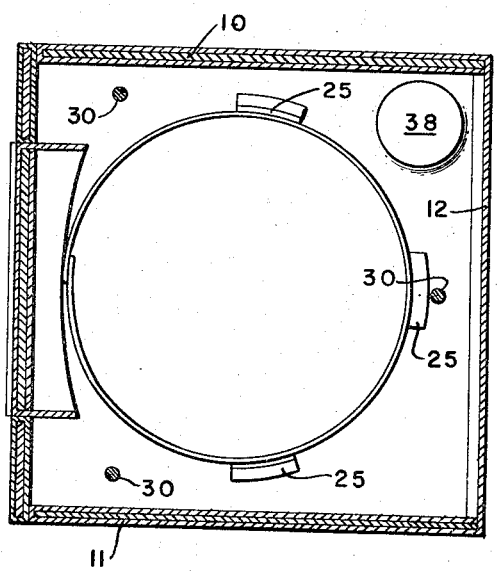
FIG.6.
FIG.8.
INVENTOR
Stephen Hopkins
BY Wilkinson, Mawhinney & Thiebault
ATTORNEYS United States Patent Office 3,353,478
Patented Nov. 21, 1967

3,353,478
WASTE COLLECTING AND COMPACTING UNIT
Stephen Hopkins, 5209 Wapokaneta Road,
Washington, D.C. 20016
Filed Feb. 24, 1966, Ser. No. 529,886
1 Claim. (Cl. 100—52)

ABSTRACT OF THE DISCLOSURE

The invention is directed to a waste collecting and compacting unit of the type for kitchen use which has a cabinet structure with a double door on a door to permit of a small waste receiving area and a larger waste removal area. The device has an internal receptacle within which is received a vertically elevatable shock dissipating compacting member which is driven up and downwardly by a motor driven worm shaft drive and wherein the drive has electrical interlocks with the two doors to render the drive inoperative should either or both doors be open to protect children from injury.

---

The present invention relates to a waste collecting and compacting unit, and has for an object to provide a compact apparatus for home use which may be installed in kitchen cabinet structure or office cabinet structure, or be blended into any cabinet structure for receiving waste material such as trash, garbage, bottles, milk cartons, etc., which unit will compress and compact waste material fed thereto into a very small compact unit for disposal.

Another object of the present invention is to provide a waste collecting and compacting unit which is provided with a front door panel having in effect two doors thereon, one which is partially openable for insertion of the waste material and the other of which fully opens the front of the unit to permit withdrawal of the compacted waste material.

A further object of the present invention is to provide a waste collecting and compacting unit in which a waste receptacle at the bottom acts as a cylinder for receiving waste material, and a compacting member cooperating therewith acts as a piston for compressing the material within the cylinder. This could be either circular, triangular or square, or of any geometric formation as long as the receptacle and the compressing member were congruent as to their geometry so that the compressing member would be complementally received within the receptacle.

A still further obect of the present invention is to provide a device of the character described in which the compressing member may be cycled between an elevated condition and a compressing condition whereby upon compressing waste material, upon descent of the compressing member a pressure or compression switch would cause reversal of the mechanism to elevate the compressing member above the receptacle to permit insertion of additional waste material until the receptacle is fully loaded.

Another object of the present invention is to provide a waste receptacle which may be expanded after the material has been compressed therein to release the material and permit re-insertion of the receptacle back into the unit.

A further object of the present invention is the provision of a safety system of interlocks between the front doors and the cabinet in electrical circuit with the drive motor so that the compacting unit cannot be activated when either front door is in the open position to endanger life or limb of children and adults in the area.

A still further object of the present invention is the provision of a compacting member having a lead end irregular compressing surface which will permit the application of various pressure moments on cylindrical or other irregular surfaces such as bottles or the like to facilitate crushing same.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 6 is a horizontal section taken on the line 6—6 in FIGURE 2.

FIGURE 7 is an assembled perspective view of the waste collecting receptacle and the compressing member with drive mechanism.

FIGURE 8 is an exploded perspective view of the waste collecting and compacting unit showing relationship of drive members, collecting and compressing members.

Figure 1:
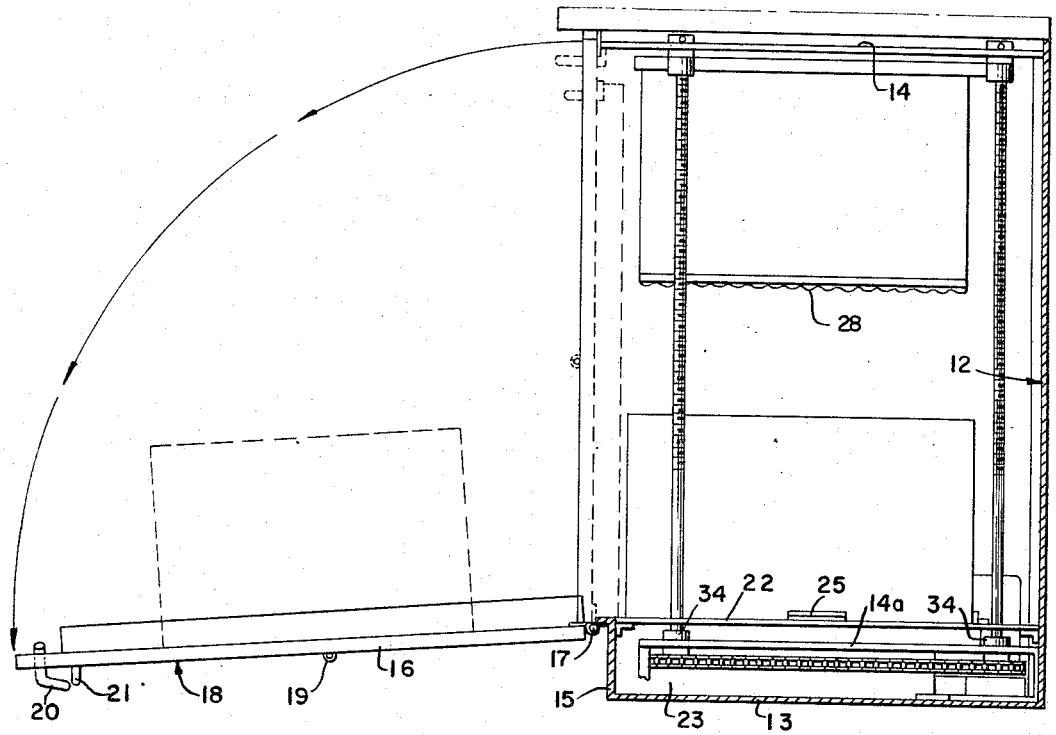
FIGURE 1 is a side elevational view of a waste collecting and compacting unit constructed in accordance with the present invention, having parts broken away and parts shown in section and dotted lines.

Referring now to the drawings, the waste compacting unit of the present invention is of cabinet-like construction having sound-proofed side walls 10 and 11, a rear wall 12 and a bottom 13. A top 14 covers the mechanism.

Figure 2:
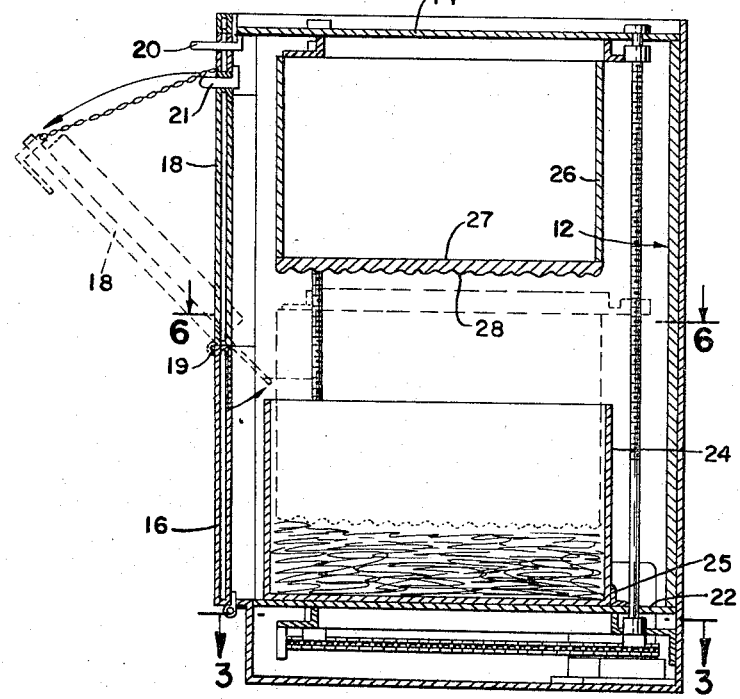
FIGURE 2 is a vertical section through the waste collecting and compacting unit of the present invention.
Figure 4:
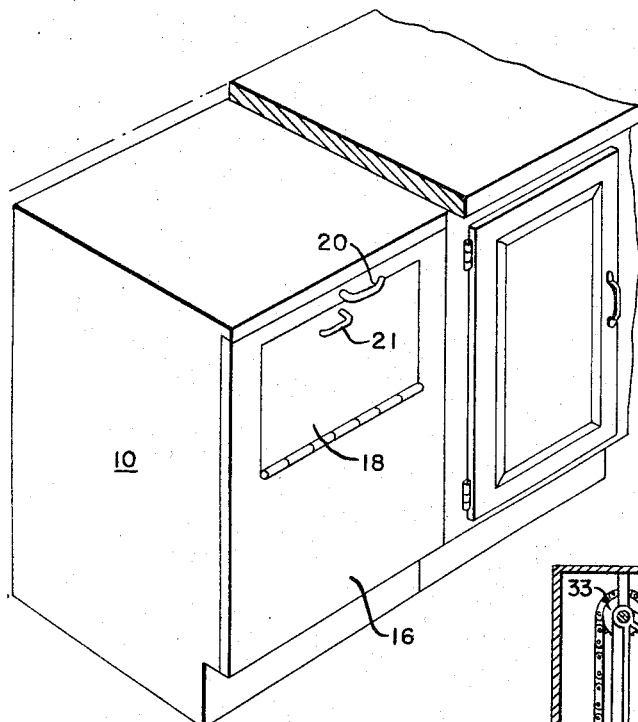
FIGURE 4 is a perspective view of the waste collecting and compacting unit of the present invention integrated with a kitchen cabinet construction.

As best seen in FIGURES 1 and 2, at the front of the unit there is an upstanding latch 15 to which a double door construction 16 is hinged at 17. The door construction 16 provides an opening to the entire internal waste collection and compressing area of the unit, while mounted in the basic front door construction 16 is a waste insertion door 18 pivoted to the main door construction 16, as at 19.

A locking handle 20 is provided for securing the main door construction 16 in the closed condition of FIGURE 2 and a locking handle 21 maintains the waste insertion door 18 in the closed condition of FIGURE 2 and will permit the door 18, upon rotation for disengagement with the main door construction 16, to open to the dotted line position of FIGURE 2. Providing the door 18 is spring loaded shut, handle 21 need not rotate but be only necessary for pulling the door open.

As best seen in FIGURE 1, a base member 22 is secured at a point removed from the bottom 13 to provide a drive area 23. Supported upon the base member 22, as best seen in FIGURE 2, is a waste collection receptacle 24 which as described hereinabove may be of any suitable geometric form.

A limit stop 25 is provided to assure alining and registering of the receptacle 24 with a waste compression member. The waste compression member is shown at 26 and having a waste engaging face 27 which is of irregular or roughened geometric configuration, shown at 28. The geometrical conformation of the compression unit 26 must have congruency with the receptacle 24. The member 26 may be hollow, as shown in FIGURE 2, or may be a block of wood or a semi-compressible, sound deadening material.

Referring now to FIGURES 7 and 8, it will be seen that the base member 22 is provided with openings 29 for receiving therethrough threaded or wormed shafts pass through complementally threaded openings 31 in a press frame 32, which press frame engages the top of the compression unit 26 which is secured thereto whereby upon rotation of the worm shafts 30 the compression unit 26 will be directed toward and away from the waste-receiving receptacle 24 dependent upon direction of rotation of the worm shafts 30. The worm shafts 30 at their bottom have secured thereto drive sprockets 33 for compelling rotation of the shafts 30.

Figure 3:
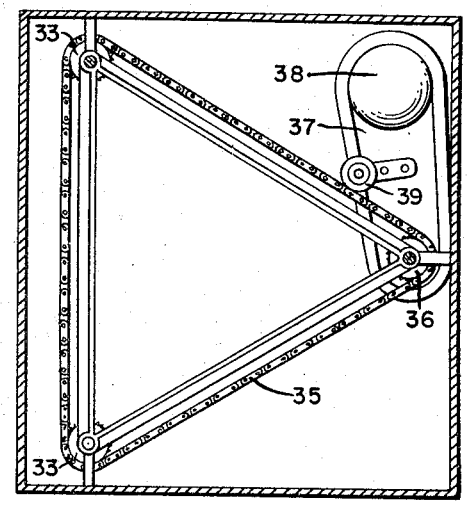
FIGURE 3 is a horizontal section taken on the line 3—3 in FIGURE 2.

Suitable bearing structures are provided for the shafts 30, for example as at 34 carried by the top of the cabinet structure 14. Locking the three shafts 30 together for rotation, two sprockets 33 and one sprocket 36 are engaged with an endless chain 35, as best seen in FIGURES 3 and 8. The chain 35 is driven by sprocket 36 through a reducer unit 37 by an electric motor 38 which is an enclosed motor. An idler 39 is provided for taking any slack out of the chain 35 to assure positive driving engagement in synchronism of all of the sprockets, 33 and 36 to cause the worm shafts to pull down even on the compressing member 26 to avoid cocking or tilting of the unit.

In the bottom of the cabinet construction a bearing alinement plate 14a is shown in the drive area 23.

Figure 5:
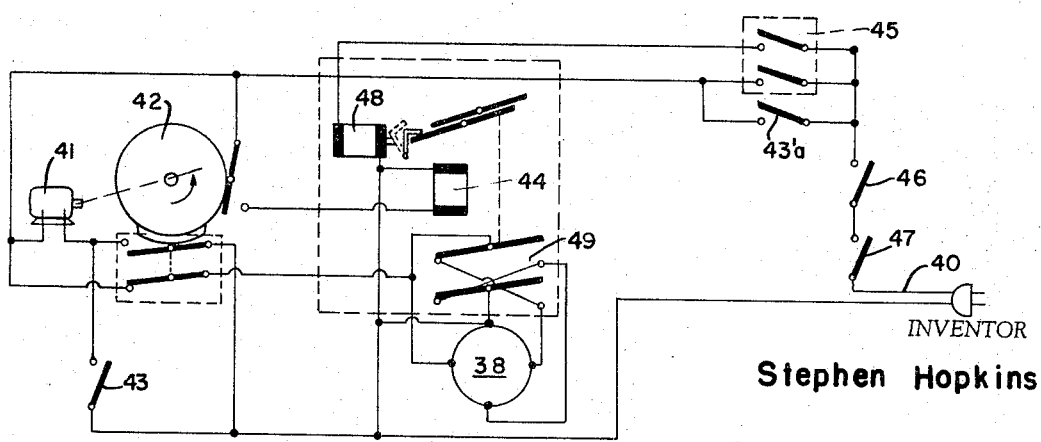
FIGURE 5 is an electrical schematic of the drive and compressing cycle circuitry of the unit herein described.

As shown in FIGURE 5 an electric power lead 40 may be plugged into a suitable source of household electric power for supplying driving power to the motor 38, causing the simultaneous driving of a cam motor 41 for driving cam 42 which will cause a delay shutdown of the main motor as well as reversal of the main motor. A compression switch 43 is in circuit and is actuated upon by the member 26 entering as far as mechanically safe into the receptacle 24, which will cause one of the shafts 30 to rock and actuate the compression switch which will stop further compression of the unit 26 into the receptacle 24, delay shutdown of the motor 38 and energize a reversing solenoid 44 causing the motor 38 to reverse its direction of rotation and elevate the member 26 to the fully raised position shown in FIGURES 1 and 2 to permit re-introduction of waste material into the unit.

A starting switch 45 is shown in circuit and a shut-off switch from the compression unit 43a is shown for automatically shutting the unit off when member 26 has returned to the fully raised position. Safety interlock switches 46 and 47 are shown in series with the power circuit and are actuated by the doors 16 and 18, respectively.

When it is desired to employ the unit as a waste collecting and compacting unit, the receptacle 24 is placed on the plate 22 with the receptacle compressed circumferentially tighter than its total area of expansion so that after complete compaction of waste material thereinto it may be circumferentially expanded to release the waste material.

The doors 16 and 18 are closed. The plug 40 inserted in a conventional house outlet having, for example, 110 volts, 60-cycle current, and the unit is ready for operation, being in the position shown in FIGURES 1 and 2. Waste material is introduced into the unit by opening the door 18 and sliding the material down into the receptacle 24. When the receptacle 24 has received a substantial amount of material, the start button 45 is pressed and held down until the motor 38 is energized and it is then released. Switch 45 operates solenoid 48 actuating reversing switch 49 and simultaneously by-passes 43a so that motor 38 can start. Switch 43a automatically completes the circuit. Motor 38, through a transmission unit 37, drives chain 35 compelling rotation of shafts 30. These shafts 30 cause the compression frame 32 to descend and introduce the compressing member 26 into the receptacle 24 to compress the waste material, as shown in FIGURE 2.

When the waste material has been compressed to the maximum degree compaction short of the destruction of the machine, the compression switch 43 will cause the motor 41 to operate cam 42 which to stop actuates solenoid 44 reversing direction of rotation of the main motor 38 and withdrawing the member 26 from the receptacle 24 to the original start position of FIGURES 1 and 2 at the conclusion of which the door 18 may then be reopened and further waste material inserted.

When the receptacle 24 has been filled, the large front door construction 16 is opened, as shown in FIGURE 1, and the waste receptacle 24 is removed therefrom and circumferentially expanded to discharge a very compact, small unit of waste material.

Although I have disclosed herein the best form of the invention known to me at this time, I reserve the right to all such modifications and changes as may come within the scope of the following claim.

What is claimed is:

A kitchen waste compacting unit comprising
 (a) an expandable receptacle adapted to be seated upon a firm base in a condition of constriction less than its expanded condition and having an open top,
 (b) a shock dissipating compacting member complemental to the expandable receptacle open top and having a stroke depth equal to the depth of the receptacle,
 (c) three worm shafts vertically mounted for rotation in a base support beneath the open top receptacle,
 (d) a press member connected to said compacting member and having complemental threads with said worm shafts and driven thereby, and
 (e) drive means including an electric drive motor, reducer and chain drive to drive sprockets secured to rotate the worm shafts which are geometrically located at the vertices of an equilateral triangle connected to drive said worm shafts in synchronism to cause said compacting member to enter said receptacle under even pressure starting at a high point with the entrance end of the compacting member above the top of the receptacle sufficient to permit dumping of waste into the receptacle prior to waste compaction, thereafter descending into the receptacle compressing and compacting waste until said compacting member encounters a predetermined force causing cessation of the compacting cycle after which the compacting member will return to an origin position above the receptacle,
 (f) a closed cabinet structure about the unit having a primary door on the front for remvoing the receptacle to discharge its compressed contents, and a secondary door in said primary door of smaller area than said primary door and being located at a point above the top of the waste receptacle, and
 (g) electrical interlocks between said primary door and the line supply to said motor and said secondary door and the line supply to said motor so that the motor cannot be energized to cause the compacting member to enter the receptacle with either door open.

References Cited

UNITED STATES PATENTS

| 1,646,355 | 10/1927 | Hill. | |
| 2,968,235 | 1/1961 | Marica | 100—218 |
| 3,079,856 | 3/1963 | Swartz. | |
| 3,099,952 | 8/1963 | Dixon et al. | 100—215 X |
| 3,104,607 | 9/1963 | Galas | 150—53 |
| 3,208,372 | 9/1965 | Taylor | 100—98 |
| 3,274,922 | 9/1966 | Hefner | 100—53 X |

FOREIGN PATENTS

| 118,250 | 3/1944 | Australia. |

BILLY J. WILHITE, *Primary Examiner.*